United States Patent [19]

Johnston et al.

[11] Patent Number: 4,507,515

[45] Date of Patent: Mar. 26, 1985

[54] LUBRICATING OIL COMPOSITIONS CONTAINING ETHYLENE-ALPHA-OLEFIN POLYMERS OF CONTROLLED SEQUENCE DISTRIBUTION AND MOLECULAR HETEROGENEITY

[75] Inventors: John E. Johnston, Westfield; Ricardo Bloch, Scotch Plains; Gary W. Ver Strate, Matawan; W. R. Song, Short Hills, all of N.J.

[73] Assignee: Exxon Research & Engineering Co., Florham Park, N.J.

[21] Appl. No.: 564,018

[22] Filed: Dec. 21, 1983

[51] Int. Cl.³ ............................................. C10M 1/18
[52] U.S. Cl. ............................................. 585/12
[58] Field of Search ............................. 585/12

[56] References Cited

U.S. PATENT DOCUMENTS

| | | | |
|---|---|---|---|
| 3,551,336 | 12/1970 | Jacobson et al. | 585/12 |
| 3,691,078 | 9/1972 | Johnston et al. | 585/12 |
| 3,697,429 | 10/1972 | Engel et al. | 585/12 |

*Primary Examiner*—William R. Dixon, Jr.
*Assistant Examiner*—C. Johnson
*Attorney, Agent, or Firm*—John J. Mahon

[57] ABSTRACT

Ethylene-alpha-olefin copolymers are disclosed being particularly useful as improving the low temperature viscosity and pumpability properties of lubricating oil comprised of a major and minor component each of which have a defined ethylene sequence distribution with respect to the number of ethylenes in sequences of three or more and the percent of ethylene sequences of three or more ethylene units. Ethylene-propylene copolymers are the preferred embodiment.

22 Claims, No Drawings

LUBRICATING OIL COMPOSITIONS CONTAINING ETHYLENE-ALPHA-OLEFIN POLYMERS OF CONTROLLED SEQUENCE DISTRIBUTION AND MOLECULAR HETEROGENEITY

This invention relates to lubricating oil compositions containing ethylene alpha-olefin copolymers having a certain defined heterogeneity and ethylene sequence content, which copolymers have been found to be especially effective as low temperature pumpability improvers for oils of lubricating viscosity.

Lubricating oil compositions which use ethylene propylene copolymers or, more generally, ethylene-$C_3$-$C_{18}$ alpha olefin copolymers as viscosity index improvers or viscosity modifiers are well known in the art. Lubricating oils also contain, in varying amounts, pour point depressants which are required additives to modify the formation of solid wax crystals at low temperatures. The amount and quality of such pour depressant additives is somewhat a function of the basestock quality mineral lubricating oil employed.

It is a recognized problem in the art that such ethylene copolymers, while providing highly desirable viscosity properties, are not totally satisfactory at low temperatures, such as 0° C. to −40° C., because the nature of their response to pour depressant additives and basestock types at such temperatures can cause instability or drastic changes in the pour point and low temperature pumpability.

Representative disclosures dealing with these low temperature difficulties include U.S. Pat. No. 3,697,429 issued Oct. 10, 1972 to Engel et al., which shows a blend of ethylene propylene copolymers having different ethylene contents, i.e. a first copolymer of 40–83 wt % ethylene and a second copolymer of 3–70 wt% ethylene, with the content of the first differing from the second by at least +4 wt% ethylene. The blends, are said to improve the viscosity index of lubricating oils with minimization of adverse interaction between the lube oil pour depressant and the ethylene propylene copolymer.

Johnston et al, U.S. Pat. No. 3,691,078 issued Sept. 12, 1972, deal with the same problem of low temperature viscosity and pour point by providing the use of ethylene propylene copolymers containing 25-55 wt% ethylene which have a pendent index of 18-33, an average pendent size not exceeding 10 carbon atoms, which copolymers provide to the oils good low temperature properties with respect to viscosity and pour point.

Jacobson et al. in U.S. Pat. No. 3,551,336 disclose ethylene copolymers of 60-80 mole % ethylene, having no more than 1.3 wt% of a polymer fraction which is insoluble in normal decane at 55° C., the insoluble portion corresponding to a high ethylene content, and minimization of this decane insoluble fraction in the polymer reduces the tendency of the ethylene propylene copolymers to form haze, which is evidence of low temperature instability probably caused by adverse interaction with pour depressant additives.

The present invention is based upon the discovery that ethylene-alpha olefin copolymers having a certain combination of specific polymer characteristics, in particular a defined ethylene sequence and compositional distribution, provide to lubricating oils highly desirable viscosity and pumpability properties at low temperatures. These copolymers can include those having weight percent ethylene contents heretofore considered unsuitable for use as viscosity modifiers in lubricating oil.

In accordance with the present invention there have been discovered lubricating oil compositions comprising a major amount of an oil of lubricating viscosity exhibiting improved viscosity and pumpability properties at low temperature containing an effectve amount of an ethylene alpha-olefin copolymer of controlled sequence distribution and molecular heterogeneity, said copolymer having a major and minor portion, said major portion having a Mw, weight average molecular weight, of about 10,000 to 500,000, a Mooney viscosity at 100° C. of 0.5 to 500 and a thickening efficiency of 0.4 to 4.0, an ethylene content of 10 to 60 wt% ethylene, an ethylene sequence distribution such that the mean number of ethylene units in sequence equal to or greater than three consecutive ethylene units is a value of about 3.0 to 4.5 and the fraction of ethylene sequences containing three or more consecutive ethylene units is about 0.01 to 0.30 based on the total number of ethylene sequences in said major portion; and said minor portion having an Mw of 1,000 to 2,000,000, an ethylene content of 55 to 95 wt% ethylene, an ethylene sequence distribution such that the mean number of ethylenes in sequences equal to or greater than three consecutive ethylene units is a value of about 4 to 20 and the fraction of ethylene sequences containing three or more consecutive ethylene units is about 0.35 to 0.95, based on the total number of ethylene sequences in said minor portion.

The terms "major" and "minor" as used herein have their conventional meanings, that is, the major portion of the copolymer of this invention, comprises 50% or more by weight of the copolymer. More preferably, the major portion of the copolymer of this invention will comprise 90 wt% to 99.5 wt% of the total copolymer with the optimum range being 95.5 to 99.5%.

Copolymers having the major and minor portions may be prepared by forming the major and minor portions in separate reaction processes and blending the separately prepared polymers to form the copolymers of this invention or copolymers having the major and minor portions may be prepared in situ in the same reaction process but the major and minor portions will be discrete polymers and therefore can be considered blends prepared in situ in the same reaction process. Such in situ prepared products are a preferred embodiment. The aforesaid methods of providing the copolymer having the major and minor portions are within the scope of this invention.

Another embodiment of this invention constitutes lubricating oil compositions comprising a major amount of an oil of lubricating viscosity exhibiting improved pumpability properties at low temperature containing effective amounts of either the major component alone or the minor component alone. While use of the major and minor components together constitutes the preferred embodiment of this invention, it has been found that these copolymers each may be employed in lubricating oils with advantageous results. Since the major and minor components are discrete polymeric moieties, they can be separately prepared, isolated and used.

The term "copolymer" as used herein is meant not only to apply to copolymers of two, three or more monomers such as ethylene alpha-olefin terpolymers wherein a third monomer is present, usually a nonconjugated diene. Preferred are ethylene-alpha-olefin copolymers prepared from 2 to 4 monomers wherein the third and fourth monomers are $C_3$–$C_{18}$ alphaolefin and nonconjugated dienes.

The ethylene sequence distribution, which is an essential characteristic of the polymers of this invention, may be illustrated by the following formula for a polymer segment where E represents an ethylene unit and P represents a propylene unit, propylene being the preferred alpha-olefin:

$$E_5P_1(E_2P_2)_{70}E_3PE_4P(E_1P_1)_{100}.$$

In the polymer segment above, the total number of ethylenes in sequences of $E_3$ or greater is 12, that is, the $E_5$ unit, the $E_3$ unit and the $E_4$ unit, and, therefore, the mean number of ethylenes in sequences $E_3$ or greater is a value of 4. The total number of ethylene sequences is $1E_5 + 70E_2 + 1E_3 + 1E_4 + 100E_1 = 173$, and, of these, three are $E_3$ or greater and therefore the fraction of sequences greater than or equal to 3 is 0.017. Thus, the polymer represented above would satisfy the ethylene sequence criteria for the major portion of the polymer of this invention.

Methods for determining these ethylene sequence values are known in the art and comprise established spectroscopic procedures using $C^{13}$ nuclear magnetic resonance methods as described in "Carbon-13 NMR in Polymer Science," ACS Symposium Series 103, American Chemical Society, Washington, D.C. 1978 at p. 97 and in "Polymer Sequence Determination Carbon-13 NMR Method," J. C. Randall, Academic Press, New York, N.Y. at p. 53.

The inventors hereof have used the following expressions to calculate the mean number of ethylene units in sequences of 3 or larger, $\overline{N}$, and the fraction of ethylene sequences containing 3 or more ethylenes, $E_{N \geq 3}$:

$$\overline{N} = \frac{S\delta^+\delta^+}{S\gamma\delta^+} + 2.5$$

$$E_{N \geq 3} = \frac{S\gamma\delta^+}{(2S\beta\beta + 2S\gamma\gamma + S\beta\gamma + S\gamma\delta^+)}$$

wherein the various S designations are the secondary carbon peak intensities as assigned in the references cited in the prior paragraph.

Preferred copolymers are those ethylene alphaolefin copolymers, especially ethylene-propylene copolymers, wherein the major portion Mw is from 10,000 to 250,000, the Mooney viscosity is 1 to 70, the thickening efficiency is 0.5 to 3.5, the major portion containing 25–50 wt% ethylene, most preferably 35–45 wt% ethylene, and the ethylene sequence distribution values are 3.0 to 4.0 for the mean number of ethylenes in sequences of three or more and the fraction of ethylene sequences containing three or more ethylenes is 0.05 to 0.28, and the minor portion has 60–90 wt% ethylene, most preferably 70% to 85 wt% ethylene, and an ethylene sequence distribution such that the mean number of ethylenes in sequences of three or more is 5 to 20 and the fraction of ethylene sequences containing three or more ethylenes is 0.50 to 0.85.

The higher alpha-olefins which may be used in the preparation of the copolymers used in the practice of this invention may include those monomers typically containing from 3 to about 18 carbon atoms. The alpha-olefins may be linear or branched, where the branching occurs three or more carbon atoms from the double bond. While a single olefin is preferable, mixtures of $C_3$ to $C_{18}$ olefins may be employed. Suitable examples of $C_3$ to $C_{18}$ alpha-olefins include propylene, 1-butene, 1-pentene, 1-hexene, 1-heptene, 1-octene, 1-nonene, 1-decene, 4-methyl-1-pentene, 4-methyl-1-hexene, 4-methyl-1-hexene, 4,4-dimethyl-1-pentene, 4-methyl-1-heptene, 5-methyl-1-heptene, 6-methyl-1-heptene, 4,4-dimethyl-1-hexene, 5,6,5-trimethyl-1-heptene and mixtures thereof.

While ethylene-propylene copolymers are most preferred for the purpose of this invention, it is also desirable to use a third monomer which may be one or more of the aforedescribed $C_4$ to $C_{18}$ alpha-olefins and/or $C_6$ to $C_{28}$ diolefins. These unsaturated monomers may be branched where the branching occurs three or more carbon atoms from the double bond, and mixtures of these olefinic monomers may also be employed. The amount of the third monomer contained in the polymer may range from 0 to about 10 mole percent, e.g. 0.1 to 5.0 mole percent.

The diolefins which are useful as third monomers for copolymerization with ethylene and propylene include the bicyclic, alicyclic, or aliphatic nonconjugated diolefins containing about 6–28 carbon atoms, preferably about 6–12 carbon atoms. Suitable monomers include 1,5-cyclooctadiene, 1,4-hexadiene, dicyclopentadiene, 5-methylene-2-norbornene, 5-vinyl-2-norbornene, B 1,5-cyclodecadiene, 2,4-dimethyl-2,7-octadiene, 3-(2-methyl-1-propenyl) cyclopentene, 1,5-octadecadiene, 5-ethylidene-2-norbornene, etc.

Polymers meeting the various characterization criteria of this invention may be prepared using a Ziegler catalyst-co-catalyst system which typically comprises (a) a transition metal compound of Groups I-B, III-B, IV-B, V-B, VI-B, VII-B and VIII of the Periodic Table and (b) an organometal compound of a metal of Groups I-A, II-A, II-B and III-A of the Periodic Table. Illustrative transition metal compounds are hydrocarbon-soluble vanadium compounds in which the vanadium valence is 3–5 such as $VOCl_x(OR)_{3-x}$ where x is 0–3 and R is $C_1$–$C_{10}$ hydrocarbon, $VCl_4$, $VO(AcAc)_2$ $V(AcAc)_3$ and $VOCl_x(AcAc)_{3-x}$ where x is 1 or 2 and AcAc is acetyl acetonate, $VCl_3 \cdot nB$ wherein n is 2 or 3 and B is a Lewis based capable of forming hydrocarbon soluble complexes with $VCl_3$ such as tetrahydrofuran and dimethyl pyridine. Illustrative cocatalysts are the organoaluminum compounds of the formulas $AlR_3$, $AlR_2Cl$, $AlR'RCl$, $Al_2R_3Cl_3$, $AlRCl_2$, $Al(OR')R_2$, $R_2Al$—O—$AlR_2$ and $AlR_2I$ wherein R and R' are the same or different $C_1$–$C_{10}$ hydrocarbon radicals, either aliphatic, alicyclic or aromatic. Preferably there is employed vanadium tetrachloride and ethyl aluminum sesquichloride in a continuous flow stirred reactor system where catalyst and cocatalyst, which may be premixed and are each introduced and mixed in the reactor in the presence of a reaction mixture containing polymerizing material. Precise process conditions and parameters have been established in a specific reactor as illustrated in the examples below in order to produce polymers meeting the various characterization criteria of this invention. These conditions are such that they provide a polymer having both the major and minor portions in accordance with this invention. It is also possible in accordance with this invention to operate the reactor to prepare the major or minor portions separately as illustrated below and subsequently blend these portions in order to prepare the polymer of this invention. Such polymer may be further modified by adding or blending an additional proportions of either the major or minor portions as required, for example, to affect the viscosity properties or pumpability properties of a lubricating oil basestock.

To prepare the major and minor components separately, the reactor should be operated in a well mixed regime. For simultaneous preparation of a polymer composed of both components, the reactor should be less than well mixed thereby providing regimes where catalyst and monomer concentrations fluctuate about the mean so that the minor component as defined herein is also formed. The exact conditions to provide such variations in mixing will depend on the reactor geometry and need to be determined in each case.

The presence of the major and minor components can be determined subsequent to polymerization by dissolution of the recovered polymer in n-hexane with subsequent fractionation. In some cases this can be done by simple recovery of hexane insolubles or by solvent non-solvent methods. Such solvent non-solvent methods for fractionating ethylene-propylene copolymers are disclosed, for example, by Cozewith and Ver Strate in "Macromolecules," Vol. 4, p. 482 (1971) and by Fuchs and Schneider in "Polymer Fractionation," Academic Press, 1967, p. 341.

The polymerization variables which control the presence of the major and minor component are reactor temperature, viscosity of reactor contents, agitation, feed point locations, feed rates, catalyst type and transfer agent concentration. Certain critical ranges can be placed on these variables. To produce a polymer with the correct amount and composition of the major and minor components, temperature should be from 0° and 100° C., reactor contents viscosity should be from 1 to 1,000 cps, the energy of agitation must be between $4 \times 10^3$ and $4 \times 10^5$ Joules/sec/M$^3$ with mixing Reynolds number between $2 \times 10^4$ and $2 \times 10^5$ and transfer agent between 0 and 100 ppm based on ethylene.

Mixing Reynolds number is defined as $$N_R = \frac{D^2 N \rho}{\mu}$$

where N is impeller rotational speed, D is impeller diameter, $\rho$ is fluid density and $\mu$ is fluid viscosity.

Mixing power is evaluated from the motor energy requirement and must be corrected for friction.

The exact ranges of mixing Reynolds number and agitation power are not adequate to completely define subtle variations in residence time distribution. However, it is possible to establish the correct operating range for a given reactor by the following procedure. A typical reactor is a continuous flow stirred tank reactor. The reactor is operated to produce a polymer at mid-range in transfer agent concentration, reactor temperature, solution viscosity, mixing criteria (Joules/sec./M$^3$) and mixing Reynolds number and at mid-range in composition, i.e. about 40 wt% ethylene.

The polymer is then analyzed for composition heterogeneity as follows: The recovered polymer is dissolved in hexane at a concentration of 1.5%. High ethylene polymer is insoluble or forms aggregates which eventually settle to some extent but also produce turbidity. If the solution is turbid at 23° C. as determined by any suitable visible light photometer, such that transmitted intensity is reduced by more than 3% in 10 centimeters of solution, reaction conditions are then modified as follows: either ethylene content of the polymer is lowered, i.e. by increasing the propylene/ethylene ratio in the reactor, transfer agent is increased, solution concentration is lowered, catalyst premixing is performed, reactor temperature is raised or mixing is improved by increasing agitation, moving feed introduction points, and the like, so that a polymer is prepared which results in having less than 3% reduction in transmission. When conditions are found which produce such polymer, these define the homogeneous major component.

For in situ preparation of the major and minor component to reactor, variables are changed in the opposite direction of those noted above for improving solution clarity. There will be a range in which an in situ product will be prepared having good low temperature viscosity characteristics in the lube oils. Eventually, heterogeneity becomes so gross as to produce problems in filtering the lube oil formulations containing the polymers and to cause disadvantages in low temperature performance in lubricating oil.

The heterogeneity produced is at least in part a high ethylene minor component. It is present preferably in small proportions from 0.3 to 1.5%, but may be present from 0.1 to 5%. The heterogeneity can be removed by filtering or centrifuging. The latter is more convenient for analysis. In all cases the minor component heterogeneity is comprised at least in part of polymer of ethylene content above 50 wt% and often 70-80 wt% when the major component is about 40% ethylene.

For direct polymerization of the minor component, the question of heterogeneity is not so great. Generally, the minor component is used in small enough proportions so that a few percent heterogeneity of that product is of little consequence. Furthermore, the minor component is prepared directly at the ethylene content which is formed as in situ heterogeneity.

The inventors hereof have established that ethylene alpha-olefin copolymers having the various criteria set forth herein exhibit properties not heretofore demonstrated by ethylene-alpha-olefin polymers when employed as additives for lubricating oils, most notably low viscosity at low temperatures as defined by their pumpability characteristics. Also, it has been discovered in accordance with this invention that the minor portion of the ethylene-alpha-olefin copolymers of this invention provides to an oil the highly desirable pumpability properties at low temperatures when used in combination with conventional viscosity modifiers in a lubricating oil containing an effective amount of a lube oil pour depressant.

Utilizing the copolymer additives of this invention, lubricating oils meeting the SAE (Society of Automotive Engineering) 10w viscosity grade exhibit highly desirable MRV viscosities of 30,000 or less and preferably less than 20,000 cps. Analogously they exhibit desirable viscosity properties at low temperatures in SAE grades 5W, 15W and 20W.

Another embodiment of the present invention constitutes lubricating oil compositions containing effective amounts of conventional polymeric viscosity index improvers, but having unsuitable viscosity and pumpability properties at temperatures of −25° C. or lower, which are greatly improved in their viscosity and pumpability properties at such low temperatures, through addition of a very small proportion of only the minor component of the copolymer of this invention in amounts of about 0.01 to 10% by weight relative to the amount of conventional viscosity index improver, especially hydrogenated styrene-isoprene polymers, hydrogenated butadiene-styrene polymers, styrene dialkyl maleate copolymers and ethylene-alpha-olefin copolymers including diene containing termonomers and tetrapolymers.

With respect to the use of the minor component polymer of this invention in lubricating oils which contain conventional ethylene-alpha-olefin copolymers, particularly ethylene-propylene copolymers, the presence of 0.01 to 10 wt% of the minor component polymer of this invention relative to the amount of conventional ethylene alpha-olefin copolymer, while providing substantial improvement im pumpability at low temperature, will not provide to the oil viscosity index improvement. Preferably there is used 0.01 to 6.0 wt%, optimally 0.05–2.0 wt%, of said minor component relative to the amount of said conventional ethylene-alpha-olefin copolmer. This finding is particularly relevant with respect to U.S. Pat. No. 3,697,429 which discloses blends of ethylene-alpha olefin copolymers in broad relative proportions which blends are said to improve the viscosity index. In this invention it has been found that the presence in lubricating oil of the minor component in combination with a conventional ethylene-alpha olefin copolymer does not contribute to viscosity index improvement but does provide significant improvement in pumpability as measured by the low temperature MRV viscosity. These differences in performance serve to demonstrate the novelty of the lubricating oil compositions of this invention.

Such use of the minor portion of the copolymer of this invention may be appropriate where conventional additives not encompassing the novel ethylene alpha-olefin copolymers of this invention are used in the lubricating oil to provide the desired properties of viscosity modification.

The ethylene-alpha-olefin copolymers of this invention prior to use in lubricating oil as viscosity modifiers may be grafted, including solution grafted and solid state grafted, with other polymerizable monomers and, in some cases, further functionalized or derivatized by reaction with polyfunctional compounds containing amino or hydroxy functional groups. These techniques provide functionalized ethylene-alpha-olefin copolymers which have utility as dispersants in lubricating oils as well as retaining their viscosity modifying or viscosity index improving properties. Generally, these techniques comprise grafting the ethylene-alpha-olefin copolymer or terpolymer with (a) a vinyl containing nitrogen monomer; or (b) a monomer system comprising maleic anhydride and monomers copolymerizable therewith and post-reacting the graft with a polyamine; or (c) an ethylenically unsaturated carboxylic acid material, which graft is subsequently reacted with polyamine, polyol or hydroxy amine. These techniques are disclosed, for example, in U.S. Pat. Nos. 4,146,489; 4,144,181 and 4,160,739.

The grafting of EP co- and terpolymers with polar nitrogen-containing monomers such as C-vinyl pyridines and N-vinylpyrrolidone is described in said U.S. Pat. No. 4,146,489. The ethylene propylene polymers contain about 40–70 mole % ethylene, and have a viscosity average molecular weight of about 10,000 to 200,000. The terpolymers contain about 10% by weight of a non-conjugated diene such as 1,4 hexadiene, dicyclopentadiene or ethylidene norbornene. Examples of suitable polar, nitrogen-containing monomers which are grafted to these polymers or terpolymers are 2-vinylpyridine, N-vinylpyrrolidone, 4-vinylpyridine and other lower alkyl ($C_1$–$C_8$) substituted C-vinylpyridines such as 2-methyl-5-vinylpyridine, 2 methyl-4-vinylpyridine and 2 vinyl-6-methylpyridine. Such materials are preferably solution grafted in the presence of a free radical initiator such as alkyl peroxy esters, alkyl peroxides, alkyl hydroperoxides and the like with t-butyl perbenzoate as the preferred initator. The temperature range is about 80°–150° C. and suitable solvent media include aliphatic or aromatic hydrocarbons, chlorinated aliphatic or aromatic hydrocarbons and mineral oils, the latter being preferred since it provides a convenient vehicle for blending the finished product into a lubricating oil composition.

Another category of copolymers are those described in U.S. Pat. No. 4,144,181 which are the oil soluble derivatized ethylene copolymers based upon 2–98 weight% ethylene with one or more $C_3$–$C_{28}$ alpha olefins such as propylene which are grafted, preferably solution grafted, at elevated temperatures in the presence of a free radical initiator with an ethylenically-unsaturated carboxylic acid material thereafter reacted with a polyfunctional material reactive with carboxy groups such as a polyamine, a polyol or a hydroxy amine or mixture thereof to form carboxyl-grafted polymeric derivatives which are suitable as dispersant viscosity index improvers for lubricating oil. Ethylene copolymers preferably contain 30–80 weight % ethylene and 20–70 weight % of 1 or more alpha olefins, preferably $C_3$–$C_{18}$, particularly propylene, which will have a $M_n$ in the range of about 700–500,000, preferably 10,000–50,000 as determined by vapor phase osmometry. Ethylene-propylene copolymers are particularly preferred. Also suitable are ethylene alpha olefin terpolymers which additionally contain 0.5–20 preferably 1–7 mole % of a nonconjugated polyolefin such as cyclopentadiene, 2-methylene-5-norbornene, nonconjugated hexadiene or other nonconjugated diolefins having 6–15 carbon atoms such as ethyl norbornadiene, ethylidiene norbornene and the like, as well as mixtures of such nonconjugated diolefins.

The materials which are grafted onto the copolymers or terpolymers are those compounds which contain at least one ethylenic bond and at least one, preferably two, carboxylic acid or anhydride groups such as maleic anhydride, chloromaleic anhydride, itaconic anhydride, N-hexylmaleimide or the corresponding dicarboxylic acids such as maleic acid or fumaric acid. Also suitable are the monocarboxylic acrylics and methacrylics such as acrylic and, methacrylic acid, methyl acrylate and methyl methacrylate.

The grafting of the polymers conducted as described in U.S. Pat. No. 4,144,181 in the presence of a free radical initiator such as peroxide or hydroperoxide at elevated temperatures of about 100° to 250° C. and preferably in a mineral lubricating oil solution. Subsequent to the grafting, a derivatization reaction is carried out at about 100°–250° C. with a polyamine, polyol or hydroxyamine using about 0.5–1.0 mole of reactant per mole of grafted polymer. Useful polyamines include those having 2–16 carbon atoms and about 2–6 nitrogen atoms in the molecule including the hydrocarbyl-polyamines which may contain other groups such as hydroxy, alkoxy, amide, imidazoline groups and the like. Preferred are the aliphatic saturated polyamines. Examples of suitable amine compounds include ethylene diamine, 1,2-diaminomethane, 1,3-diamino propane, triethylene tetramine, tetraethylene pentamine, 1,2-propylene amine and the like. Useful polyols include $C_2-C_{30}$ polyols having 2-10 OH groups such as pentrerythritol, $C_2-C_{30}$ hydroxy amines with 1-6 OH groups and 1-10N atoms are useful such as tris-hydroxymethyl amino-methane.

The ethylene-alpha-olefin polymers of this invention may be employed in lubricating oils in amounts varying broadly from about 0.001 to 49 wt%. The proportions giving the best results will vary somewhat according to the nature of the lubricating oil basestock and the specific purpose for which the lubricant is to serve in a given case. When used in lubricating oils for diesel or gasoline engine crankcase lubricants, the polymer concentrations are within the range of about 0.1 to 15.0 wt% of the total composition. Typically such polymeric additives are sold as concentrates wherein the additive is present in amounts of from 5 to 50 wt%, preferably 6 to 25 wt%, based on the total amount of hydrocarbon mineral oil diluent for the additive. The polymers of this invention are typically used in lubricating oils based on a hydrocarbon mineral oil having a viscosity of about 2-40 centistokes (ASTM D-445) at 99° C. but lubricating oil basestocks comprised of a mixture of a hydrocarbon mineral oil and up to about 50 wt% of a synthetic lubricating oil such as esters of dibasic acids and complex esters derived from monobasic acids, polyglycols, dibasic acids and alcohols are also considered suitable as well as poly-alpha-olefin synthetic basestocks.

Finished lubricating oils containing the ethylene-alpha-olefin polymers of the present invention will typically contain a number of other conventional additives in amounts as required to provide their normal attendant functions and these include ashless dispersants, metal or overbased metal detergent additives, zinc dihydrocarbyl dithiophosphate, anti-wear additives, antioxidants, pour depressants, rust inhibitors, fuel economy or friction reducing additives and the like.

The ashless dispersants include the polyalkenyl or borated polyalkenyl succinimide where the alkenyl group is derived from a $C_3-C_4$ olefin, especially polyisobutenyl having a number average molecular weight of about 700 to 5,000. Other well known dispersants include the oil soluble polyol esters of hydrocarbon substituted succinic anhydride, e.g. polyisobutenyl succinic anhydride, and the oil soluble oxazoline and lactone oxazoline dispersants derived from hydrocarbon substituted succinic anhydride and di-substituted amino alcohols. Lubricating oils typically contain about 0.5 to 5 wt% of ashless dispersant.

The metal detergent additives are known in the art and include one or more members selected from the group consisting of overbased oil-soluble calcium, magnesium and barium phenates, sulfurized phenates, and sulfonates especially the sulfonates of $C_{16}-C_{50}$ alkyl substituted benzene or toluene sulfonic acids which have a total base number of about 80 to 300. These overbased materials may be used as the sole metal detergent additive or in combination with the same additives in the neutral form but the overall metal detergent additive combination should have a basicity as represented by the foregoing total base number. Preferably they are present in amounts of from about 3 to 6 wt% with a mixture of overbased magnesium sulfurized phenate and neutral calcium sulfurized phenate, obtained from $C_9$ or $C_{12}$ alkyl phenols being especially useful.

The anti-wear additives useful are the oil-soluble zinc dihydrocarbyldithiophosphates having a total of at least 5 carbon atoms, the alkyl group being preferably $C_5-C_8$, typically used in amounts of about 1-6% by weight.

Other suitable conventional viscosity index improvers, or viscosity modifiers, are the olefin polymers such as polybutene, hydrogenated polymers and copolymers and terpolymers of styrene with isoprene and/or butadiene, polymers of alkyl acrylates or alkyl methacrylates, copolymers of alkyl methacrylates with N-vinyl pyrrolidone or dimethylaminoalkyl methacrylate, post-grafted polymers of ethylenepropylene with an active monomer such as maleic anhydride which may be further reacted with alcohol or an alkylene polyamine, styrene-maleic anhydride polymers post-reacted with alcohols and amines and the like. These are used as required to provide the viscosity range desired in the finished oil, in accordance with known formulating techniques.

Examples of suitable oxidation inhibitors are hindered phenols, such as 2,6-ditertiary-butyl-paracresol, amines sulfurized phenols and alkyl phenothiazines; usually a lubricating oil will contain about 0.01 to 3 weight percent of oxidation inhibitor depending on its effectiveness.

Rust inhibitors are employed in very small proportions such as about 0.1 to 1 weight percent with suitable rust inhibitors being exemplified by $C_9-C_{30}$ aliphatic succinic acids or anhydrides such as dodecenyl succinic anhydride.

Antifoam agents are typically the polysiloxane silicone polymers present in amounts of about 0.01 to 1 weight percent.

Pour depressants are used generally in amounts of from about 0.01 to about 10.0 wt%, more typically from about 0.1 to about 1 wt%, for most mineral oil basestocks of lubricating viscosity. Illustrative of pour point depressants which are normally used in lubricating oil compositions are polymers and copolymers of n-alkyl methacrylate and n-alkyl acrylates, copolymers of di-n-alkyl fumarate and vinyl acetate, alipha-olefin copolymers, alkylated naphthalenes, copolymers or terpolymers of alpha-olefins and styrene and/or alkyl styrene, styrene dialkyl maleic copolymers and the like.

A number of terms used herein in defining the ethylene alpha-olefin copolymers of the present invention and methods of evaluating the lubricating oil compositions are set forth below:

(1) Mooney viscosity: ML 1+8(100° C.), as described by ASTM D-1646;
(2) Mw and Mz: weight average molecular weights were determined using gel permeation chromatography with on line light scattering as described by G. Ver Strate in "Liquid Chromatography of Polymers and Related Materials," J. Cazes, ed., Marcel Dekker, N.Y., 1981; Commercially available software was used to analyze the chromatograms;
(3) Ethylene sequence distribution: measurements of monomer sequencing were conducted using Carbon-13 nuclear magnetic resonance techniques (NMR). A Varian XL-100 or a JEOL FX90 were used;
(4) Thickening efficiency (T.E.) is defined as the ratio of the weight percent of a polyisobutylene (sold as an oil solution by Exxon Chemical Company as Paratone N), having a Staudinger molecular weight of 20,000, required to thicken a solvent-extracted neutral mineral lubricating oil, having a viscosity of 150 SUS at 37.8° C., a viscosity index of 105 and an ASTM pour point of 0° F., (Solvent 150 Neutral) to a viscosity of 12.4 centistokes at 98.9° C., to the weight percent of a test copolymer required to thicken the same oil to the same viscosity at the same temperature.

Low temperature properties of the lubricating oils of the present invention are evaluated by a number of significant tests:

(5) MRV (Mini Rotary Viscometer), using a technique described in ASTM-D3829, a viscosity and pumpability measurement in centipoises at −25° C.;

(6) CCS (Cold Cranking Simulator) using a technique described in ASTM-D2602, a high shear viscosity measurement in centipoises at −20° C., this test is related to a lubricating oil's resistance to cold engine starting;

(7) Pour point, ASTM D97, measured in degrees Fahrenheit.

(8) Stable pour point (Federal Test Method 79-C, Method 203), a slow cool temperature soak cycle is used in this method of determining pour point;

(9) Modified cycle MRV-This is essentially the same as the ASTM MRV noted above, except a temperature cycle is used to more nearly reflect actual service conditions.

Other tests and evaluations used herein are described below:

Ethylene Content Measurement

Ethylene content is measured by ASTM-D3900 for ethylene propylene copolymers between 35 and 85 weight percent ethylene. Above 85 percent ASTM D2238 can be used to obtain methyl group concentrations which are related to percent ethylene in an unambiguous manner for ethylene propylene copolymers. When comonomers other than propylene are employed no ASTM tests covering a wide range of ethylene contents are available, however proton and carbon 13 nuclear magnetic resonance (NMR) can be employed to determine the composition of such polymers. These are absolute techniques requiring no calibration when operated such that all nucleii contribute equally to the spectra. For ranges not covered by the ASTM tests for ethylene propylene copolymers these NMR methods can also be used.

The foregoing tests, with the exception of stable pour point modified cycle MRV are part of the specifications required for a lubricant to meet the current J300 viscosity classification scheme for multigrade oils published by the Society of Automotive Engineers (SAE).

EXAMPLES

EXAMPLE I

This Example demonstrates the low temperature viscosity improvement utilizing the polymers of this invention when the polymer's major and minor components are either prepared simultaneously in situ or prepared separately and blended. The basestock oil was a blend of Solvent 100 Neutral and Solvent 250 Neutral Mid-Continent mineral lubricating oil having a narrow $C_{24}$-$C_{36}$ wax distribution and containing 0.2 (Oil A) and 0.4 wt% (Oil B) of lube oil pour depressant (vinyl acetate fumarate). MRV viscosities were measured at −25° C. for the samples. Results are in Table I.

TABLE I

| | MRV VISCOSITY, cps | |
|---|---|---|
| Ethylene-Propylene Copolymer Additive, wt % in Oil | Oil A: 0.2 wt % Pour Depressant | Oil B: 0.4 wt % Pour Depressant |
| 1. EP-Comparison, 1.1% | 41,000 | $10^6$ |
| 2. Major + Minor, In Situ 1.13% | 23,700 | 21,300 |
| 3. Major Component, 1.13% | 29,500 | 27,800 |
| 4. (a) Major 1.12% + Minor 0.097%, Blended | 21,600 | 14,800 |
| (b) Major 1.12% + Minor 0.0048%, Blended | 22,000 | — |
| (c) Major 1.12% + Minor 0.0019%, Blended | 24,000 | — |
| (d) Major 1.12% + Minor 0.00097%, Blended | 25,500 | — |
| 5. Major 1.12% + Minor 0.097%, Blended | 40,800 | — |

Copolymer Additive 1 is a conventional ethylenepropylene viscosity-index improver having 45 wt% ethylene, an Mw of 160,000, a T.E. of 2.8 and ethylene sequence distribution such that the mean number of ethylenes in sequences of 3 or more ethylene units is 4.0 and the fraction of ethylene sequences 3 and longer is 0.31.

Copolymer Additive 2 is an ethylene-propylene copolymer of this invention as prepared and described in Example IV.

Copolymer 3 is a copolymer of this invention consisting only of the major component as prepared and described in Example IV.

Copolymers 4 and 5 are copolymers of this invention prepared by separately making the major and minor components and blending them together. In copolymer 4, the minor component had 81 wt% ethylene and in copolymer 5, the minor component had 60 wt% ethylene. The preparation and description of these compounds appears below in Example IV.

Examples I-2 and I-4 represent major improvements over Example I-1. Example I-5 shows that this particular minor component is not effective in the specific basestock used.

EXAMPLE II

The same five copolymer additives as used in Example I were evaluated at the same concentrations in a different basestock oil being a blend of Solvent 100 Neutral and 12% bright stock and having a broad wax distribution which either contained 0.2 wt% (Oil A) or 0.4 wt% (Oil B) of a styrene dialkyl maleate (SDM) pour depressant. Results are in Table II.

TABLE II

| | MRV, cps. | |
|---|---|---|
| Copolymer Additives | Oil A, 0.2 wt % SDM | Oil B, 0.4 wt % SDM |
| 1. | 27,300 | 26,000 |
| 2. | 18,900 | 17,300 |
| 3. | 26,500 | 19,300 |
| 4(a) | 26,700 | 18,800 |
| 5. | 18,700 | 18,800 |

Examples II-2 and II-5 represent significant improvements over II-1 and II-3. For this basestock oil a comparison of Examples II-4 and II-5 again shows the importance of evaluating the effectiveness of the minor component in the basestock oil being treated. Here, Example II-5 has the minor component which is highly effective in this basestock, in contrast to the results of Example I where a different basestock oil was used.

EXAMPLE III

This example demonstrates the use of the minor component polymer of this invention as a pumpability additive when used in combination with a conventional viscosity modifier copolymer. The minor component used in these formulations was the same as that used in copolymer 4 of Examples I and II. The basestock oil was the same as used in Example I. Results are in Table III.

TABLE III

| Copolymer Additive, wt % in oil | MRV, cps |
|---|---|
| 6. EP, 1.1% | 486,000 |
| 7. EP 1.1% plus 0.01% Minor Component | 28,600 |
| 8. styrene-isoprene, 1.8% | 20,400 |
| 9. styrene-isoprene 1.8% plus 0.01% Minor Component | 9,600 |

Copolymer additives 6 and 8 are respectively, commercially available ethylene-propylene and hydrogenated styrene-isoprene polymeric viscosity index improvers for lubricating oils. They are used here to illustrate the dramatic improvement obtained through use of the minor component copolymer of this invention.

EXAMPLE IV

Copolymer Preparations

Ethylene-propylene copolymer additives of this invention whose lube oil evaluations are in the foregoing examples were prepared in a continuous flow stirred tank polymerization reactor which was a 3 gallon cylindrical reactor with two vertical, 180° spaced baffles, and a four blade, flat blade impeller with separate entry points for catalyst, co-catalyst and monomer feedstreams. Hexane was the solvent, VCl$_4$ was the catalyst and ethyl aluminum sesquichloride was the co-catalyst and H$_2$ the transfer agent in all reactions. Reactor conditions are set forth in the following Table Va for the various copolymers of this invention.

Hexane was purified prior to use by passing over 4A molecular sieves (Union Carbide, Linde Div. 4A 1/16" pellets) and silica gel (W. R. Grace Co., Davison Chemical Div., PA-400 20-40 mesh) to remove polar impurities which act as catalyst poisons. Gaseous ethylene and propylene were passed over hot (270° C.) CuO (Harshaw Chemical Co., Cu1900 ¼' spheres) to remove oxygen followed by molecular sieve treatment for water removal and then were combined with the hexane upstream of the reactor and passed through a chiller which provided a low enough temperature to completely dissolve the monomers in the hexane. Polymerization temperature was controlled by allowing the cold feed to absorb the heat of reaction generated by the polymerization. The reactor outlet pressure was controlled at 413 kPa to ensure dissolution of the monomers and a liquid filled reactor.

Copolymer was deashed by contacting with aqueous base and recovered by steam distillation of the diluent with mill drying of the product to remove residual volatiles. The product so prepared was analyzed for composition, compositional distribution and molecular weight distribution using the techniques discussed in the specification.

EXAMPLE IV

TABLE IVa

| | Process Reactor Conditions | | | |
|---|---|---|---|---|
| | Copolymers of Example I, Table I | | | |
| Reactor Conditions | EP #2 | EP #3 | EP #4(minor) | EP #5(minor) |
| Temp °C. | 38 | 38 | 65 | 38 |
| Pressure, kPa | 413 | 413 | 413 | 413 |
| Impeller, rpm | 900 | 900 | 900 | 900 |
| Al/V, mole ratio | 4.5 | 4.5 | 4.5 | 4.5 |
| Residence time, min | 17 | 17 | 10 | 12 |
| Hexane, L/Hr. | 34.9 | 34.9 | 58.1 | 49.3 |
| Ethylene, g/hr | 540 | 545 | 1689 | 1611 |
| Propylene, g/hr | 832 | 877 | 876 | 98.7 |
| Catalyst, /min | .0343 | .0277 | .0464 | .0571 |
| Co-catalyst/min | .0993 | .0800 | .1340 | .1640 |
| Transfer Agent, ppm (wt H$_2$/wt ethylene) | None | 21 | 15 | 28 |

Tables IVb and IVc report product analyses and heterogeneity measurements for these copolymers.

EXAMPLE IV

TABLE IVb

| | Product Analysis | | | | | |
|---|---|---|---|---|---|---|
| Copolymer | ML | wt % Ethylene | $\bar{N}$ | $E_N \geq 3$ | T.E. | $\bar{M}w \times 10^5$ |
| EP #2 | 55 | 42 | 4.0 | 0.27 | 2.73 | 1.8 |
| EP #3 | 55 | 41 | 3.6 | 0.22 | 2.73 | 1.7 |
| EP #4 (minor component) | 46 | 81 | 7.7 | 0.75 | — | 1.5 |
| EP #5 (minor component) | 48 | 60 | 5.4 | 0.54 | — | 1.3 |

Notes:
ML is Mooney viscosity, $\bar{N}$ and $E_N \geq 3$ are described hereinabove and T.E. is Thickening Efficiency.

EXAMPLE IV

TABLE IVc

| | Heterogeneity Measurements | | | |
|---|---|---|---|---|
| Copolymer | T.E. | n-hexane Turbidity* | % Insol. | wt % ethylene in Isolated Insolubles |
| EP #1 | 2.79 | >3% | 0.25% | 78% |
| EP #2 | 2.73 | >3% | 0.30% | 65% (degraded) |
| EP #3 | 2.73 | <3% | 0 | — |

*Light transmittance through solvent as described hereinabove.

What is claimed is:

1. A lubricating oil composition comprising a major amount of an oil of lubricating viscosity exhibiting improved viscosity and pumpability properties at low temperatures containing an effective amount of an ethylene alpha-olefin copolymer of controlled sequence distribution and molecular heterogeneity, said copolymer having a major and minor portion, the major portion having a Mw (weight average molecular weight) of about 10,000 to 500,000, a Mooney viscosity at 100° C. of 0.5 to 500 and a thickening efficiency of 0.4 to 4.0, an ethylene content of 10 to 60 wt% ethylene and an ethylene sequence distribution such that the mean number of ethylene units in sequences equal to or greater than three consecutive ethylene units is a value of about 3 to 4.5 and the fraction of ethylene sequences containing three or more consecutive ethylene units is about 0.01 to 0.30 based on the total number of ethylene sequences in said major portion, and said minor portion has an Mw of 1,000 to 2,000,000, an ethylene content of 55 to 95 wt% ethylene, an ethylene sequence distribution such that the mean number of ethylenes in sequences equal to or greater than three consecutive ethylene units is a value of about 4 to 20 and the fraction of ethylene sequences containing three or more consecutive ethylene units is about 0.35 to 0.95, based on the total number of ethylene sequences in said minor portion.

2. A lubricating oil composition according to claim 1 wherein the major portion of said copolymer has an Mw from 10,000 to 250,000, a Mooney viscosity of 1 to 70, a thickening efficiency is 0.5 to 3.5, 25–50 wt% ethylene, and the ethylene sequence distribution values are 3.0 to 4.0 for the mean number of ethylenes in sequences of three or more and the fraction of ethylene sequences of three or more is 0.05 to 0.28, and the minor portion of said copolymer has 60–90 wt% ethylene, an ethylene sequence distribution such that the mean number of ethylenes in sequences of three or more is 5 to 20 and the fraction of ethylene sequences of three or more is 0.50 to 0.80.

3. A composition according to claim 1 wherein the copolymer is an ethylene propylene copolymer.

4. A composition according to claim 2 wherein the copolymer is an ethylene propylene copolymer.

5. A composition according to claim 1 or 2 wherein said major and minor portions are separately prepared and blended.

6. A composition according to claim 1 or 2 wherein said major and minor portions are composed of discrete polymerized molecules prepared in situ in the same reaction process.

7. A lubricating oil composition according to claim 1 wherein said major portion comprises 90 to 99.5 wt% of said copolymer.

8. A lubricating oil composition according to claim 1 wherein said major portion comprises 95.5 to 99.5 wt% of said copolymer.

9. A lubricating oil composition comprising a major amount of an oil of lubricating viscosity exhibiting improved viscosity and pumpability properties at low temperature containing an effective amount of an ethylene α olefin copolymer having an Mw, weight average molecular weight of about 10,000 to 500,000, a Mooney viscosity at 100° C. of 5 to 500, a thickening efficiency of 0.4 to 4.0, an ethylene content of 10 to 60 wt% ethylene, an ethylene sequence distribution such that the mean number of ethylenes in sequences equal to or greater than three consecutive ethylene units is a value of about 3.0 to 4.5 and the fraction of ethylene sequences of three or more consecutive ethylene units in about 0.01 to 0.30 based on the total number of ethylene sequences.

10. A lubricating oil composition according to claim 9 wherein the copolymer has an Mw from 10,000 to 200,000, Mooney viscosity is 1 to 70, a thickening efficiency is 0.5 to 3.5, 25–50 wt% ethylene, and the ethylene sequence distribution values are 3.0 to 4.0 for the mean number of ethylenes in sequences of three or more and the fraction of ethylene sequences of three or more is 0.05 to 0.28.

11. A lubricating oil composition according to claim 9 wherein the copolymer is an ethylene-propylene copolymer.

12. A lubricating oil composition according to claim 10 wherein the copolymer is an ethylene propylene copolymer.

13. A lubricating oil composition comprising a major amount of an oil of lubricating viscosity exhibiting improved viscosity and pumpability properties at low temperature containing an effective amount of an ethylene-alpha-olefin copolymer having a Mw of 1,000 to 2,000,000, an ethylene content of 55 to 95 wt% ethylene, an ethylene sequence distribution such that the mean number of ethylenes in sequences equal to or greater than three consecutive ethylene units is a value of about 4 to 20 and the fraction of ethylene sequences of three or more consecutive ethylene units is from about 0.35 to 0.95, based on the total number of ethylene sequences.

14. A lubricating oil composition according to claim 13 wherein the copolymer has 60–90 wt% ethylene, and an ethylene sequence distribution such that the mean number of ethylenes in sequences of three or more is 6 to 20 and the fraction of ethylene sequences of three or more is 0.50 to 0.80.

15. A lubricating oil composition according to claim 13 wherein the copolymer is an ethylene-propylene copolymer.

16. A lubricating oil composition according to claim 14 wherein the copolymer is an ethylene-propylene copolymer.

17. A lubricating oil composition comprising a major amount of an oil of lubricating viscosity containing an effective amount of a polymeric viscosity index improving additive where low temperature viscosity and pumpability is improved by incorporation into said lubricating oil composition of 0.01 to 10 wt%, based on the weight of said polymeric viscosity index improving additive, of an ethylene-alpha-olefin copolymer pumpability additive having a Mw molecular weight of about 1,000 to 2,000,000, an ethylene content of 55 to 95 wt% ethylene, an ethylene sequence distribution such that the mean number of ethylenes in sequences equal to or greater than three consecutive ethylene units is a value of about 4 to 20 and the fraction of ethylene sequences of three or more consecutive ethylene units is from about 0.35 to 0.95, based on the total number of ethylene sequences in said copolymer.

18. A composition according to claim 17 wherein the viscosity index improving additive is an ethylene-propylene copolymer, a hydrogenated styrene-isoprene copolymer, a hydrogenated butadiene-styrene copolymer or a styrene dialkyl maleate copolymer.

19. A composition according to claim 17 wherein the polymeric viscosity index improver is an ethylene-propylene copolymer and said pumpability additive is present in an amount of about 0.01 to 6.0 wt% based on the weight of the polymeric viscosity index improver.

20. A composition according to claim 19 wherein there is present 0.05 to 2.0 wt% of said pumpability additive.

21. A composition according to claim 17 wherein said pumpability additive is an ethylene-propylene copolymer.

22. A composition according to claim 21 wherein said ethylene-propylene copolymer contains 60–90 wt% ethylene.

* * * * *